(12) United States Patent
Follestad et al.

(10) Patent No.: US 6,242,543 B1
(45) Date of Patent: Jun. 5, 2001

(54) PROCESS FOR PRODUCING POLYETHYLENES HAVING A BROAD MOLECULAR WEIGHT DISTRIBUTION, AND A CATALYST SYSTEM USED THEREBY

(75) Inventors: Arild Follestad, Stathelle; Richard Blom; Ivar Martin Dahl, both of Oslo; Klaus-Joachim Jens, Langesund; Svein Staal Eggen, Eidanger, all of (NO)

(73) Assignee: Borealis A/S, Lyngby (DK)

(*) Notice: Subject to any disclaimer, the term of this patent is extended or adjusted under 35 U.S.C. 154(b) by 0 days.

(21) Appl. No.: 09/117,206

(22) PCT Filed: Jan. 23, 1997

(86) PCT No.: PCT/NO97/00018

§ 371 Date: May 3, 1999

§ 102(e) Date: May 3, 1999

(87) PCT Pub. No.: WO97/27225

PCT Pub. Date: Jul. 31, 1997

(30) Foreign Application Priority Data

Jan. 26, 1996 (NO) .................................... 960350

(51) Int. Cl.$^7$ ...................................... C08F 4/42
(52) U.S. Cl. ................. 526/118; 526/160; 526/548; 526/943; 526/129; 526/905; 526/95; 526/104; 502/117; 502/152
(58) Field of Search .................... 502/117, 152; 526/118, 160, 348, 943, 129, 905, 95, 104

(56) References Cited

U.S. PATENT DOCUMENTS

| | | |
|---|---|---|
| 3,378,536 | 4/1968 | Walker et al. . |
| 3,709,853 | 1/1973 | Karapinka . |
| 4,015,059 | 3/1977 | Karol . |
| 4,424,139 | 1/1984 | McDaniel et al. . |
| 4,530,914 | 7/1985 | Ewen et al. . |
| 4,918,038 | 4/1990 | Samuels et al. . |
| 5,330,950 | 7/1994 | Hsieh . |
| 5,399,622 | 3/1995 | Geerts et al. . |
| 5,408,015 | 4/1995 | Hsieh et al. . |
| 5,527,867 | 6/1996 | Bergmeister . |
| 5,543,376 * | 8/1996 | Bergmeister .......................... 502/117 |
| 5,624,877 | 4/1997 | Bergmeister et al. . |
| 5,648,439 | 7/1997 | Bergmeister et al. . |

FOREIGN PATENT DOCUMENTS

| | | |
|---|---|---|
| 0 088 562 | 9/1983 | (EP) . |
| WO 97/08213 | 3/1997 | (WO) . |

\* cited by examiner

*Primary Examiner*—David W. Wu
*Assistant Examiner*—Ling Siu Choi
(74) *Attorney, Agent, or Firm*—Scully, Scott, Murphy & Presser

(57) ABSTRACT

A process for the polymerization of ethylene and optionally α-olefins to form ethylene homopolymer or copolymers having a broad molecular weight distribution, comprising polymerization of 100–80 wt. % of ethylene and 0–20 wt. % of comonomer in the presence of two independent, simultaneously present catalysts A and B, wherein catalyst A, deposited on an inorganic support, comprises chromium in a predominantly oxidant state of 2 and catalyst B comprises a bis-cyclopentadienyl chromium compound reacted with an inorganic support.

12 Claims, 5 Drawing Sheets

PROCESS FOR PRODUCING POLYETHYLENES HAVING A BROAD MOLECULAR WEIGHT DISTRIBUTION, AND A CATALYST SYSTEM USED THEREBY

TECHNICAL FIELD

The present invention relates to a process for the polymerization of ethylene, optionally with α-olefins, to obtain polyethylenes having a broad molecular weight distribution, and a catalyst system for use in said process. More particularly, the present invention relates to a process for the production of ethylene homopolymers and copolymers that have an especially broad molecular weight distribution; polyethylenes produced thereby; and a novel and improved catalyst system which includes two independent catalysts, comprising chromium oxide on an inorganic support and the other comprising bis-cyclopentadienyl chromium compound reacted with an inorganic support. Articles made from the obtained polyethylene compositions exhibit particularly good environmental stress cracking resistance (ESCR) performance.

PRIOR ART

Polyethylenes, homo- and copolymers, that are linear and have few and short branches on its backbone, such as high density polyethylene (PEHD) and linear low density polyethylene (PELLD), are produced commercially by catalyzed polymerizations. To obtain linear polyethylenes with a particularly broad or bimodal molecular weight distribution, two reactors are usually used in a series. Ethylene and the total amount of catalysts are in general fed into the first reactor, from where the obtained polymer is fed to the second reactor and mixed with an additional amount of ethylene which is then polymerized. Comonomers, usually α-olefins, may be added either in the first or second reactor. Morphology, molecular weight and molecular weight distribution of the final polyethylene depends on the type of catalyst used and the polymerization conditions. To obtain polyethylenes with specific properties, certain combined catalyst systems may be used.

Catalysts often used in the polymerizations of α-olefins are chromium oxide based catalysts, such as those disclosed in Kirk-Othmer, "Encyclopedia of Chemical Technology", 1981, Vol. 16, p. 402. Such catalysts give high molecular weight ethylene homopolymers and copolymers, but the molecular weight can be difficult to control. Another well known catalyst is bis-cyclopentadienyl chromium disposed on a support of calcined silica. In the absence of hydrogen this catalyst gives high molecular weight polyethylenes, and in the presence of hydrogen low molecular weight polyethylenes.

U.S. Pat. No. 3,378,536 discloses a process for polymerizing ethylene by the use of a two-component catalyst system consisting of (a) chromium deposited on a support, e.g. silica, where the chromium is activated in dry air or an oxygen-containing gas at a temperature of 400 to 815° C., and then reduced with CO before use; and (b) chromium or vanadium arene where the arene is an aromatic $C_6$ ring, which optionally is substituted with $C_{1-20}$ alkyl, cycloalkyl or aryl. The catalyst: components are preferably fed to the polymerization reactor separately.

U.S. Pat. No. 3,709,853 states that bis-cyclopentadienyl chromium(II) on an inorganic oxide support is a very efficient catalyst for the polymerization of ethylene over a wide range of reaction conditions, in particular in the presence of hydrogen. Produced polyethylenes have a high molecular weight and a narrow molecular weight distribution.

U.S. Pat. No. 4,530,914 relates to polyolefins having a broad molecular weight distribution obtained by the use of a catalyst system comprising two or more metal cyclopentadienyl compounds, each having different polymerization rates. The metal component is preferably Ti or Zr, and also an alumoxan is used. The working examples reveal that the molecular weight distributions are not particularly broad, with a highest polydispersity, $M_w/M_n$, of only 7.8, which today is common incommercial polymers. Comonomers are not used.

U.S. Pat. No. 4,918,038 discloses a process for the production of polyethylenes having a broad and/or bimodal molecular weight distribution. It is used a complex catalyst system comprising a plurality of metal halide compounds. The catalyst system results in an inclusion of comonomers in the polymer backbone.

U.S. Pat. No. 4,015,059 discloses the use of a catalyst prepared by reacting an inorganic oxide with bis-cyclopentadienyl, bis-indenyl or bis-fluorenyl chromium in the polymerization of ethylene, optionally with other α-olefins. The chromium atoms in the cyclopentadienyl ligands are believed to be connected through oxygen to the metal atoms in the support. However, the obtained polymers have narrow molecular weight distributions.

U.S. Pat. No. 4,424,139 teaches the use of phosphate-containing chromocene or chromoxide catalysts.

EP 088 562 discloses a modified polymerization catalyst comprising a silica support and chromium deposited thereon. After oxidation in dry air the chromium is modified by being contacted with a transition metal compound bonded to an inorganic rest. The transition metal is Ti, V or Cr, preferably Ti. Preferably, the ligand is an unsaturated carbocyclic or heterocyclic ring system containing 6 delocalized π-electrons, for example cyclic carbanions, such as cyclopentadienyl anion, and derivatives thereof. Only the use of bis-toluene titan is exemplified, and the obtained polyethylenes have a substantial degree of branching and a medium broad molecular weight distribution.

U.S. Pat. No. 5,330,950 and U.S. Pat. No. 5,408,015 relate to ethylene polymers having a broad molecular weight distribution. The polyethylenes are produced by the use of a mixture of a MgO-supported Ziegler catalyst and a chromium oxide catalyst.

U.S. Pat. No. 5,399,622 discloses a process for the polymerization of ethylene by starting with a chromium oxide catalyst to obtain granules of low density polyethylene, and then the polymerization is continued by adding a cocatalyst and an yttrium-containing catalyst of formula $(Cp_2YX_x)_yM_zL_n$, wherein Cp is cyclopentadienyl optionally substituted with alkyl or alkylsilyl radicals, X is a halide, M is an alkali metal and L is an electron donor ligand, to obtain an outer shell of high density polyethylene on said granules.

Instead of using two reactors in series operating at different conditions, it would be desirable to use one single reactor and two different types of catalysts to obtain a composition consisting of two different ethylene polymers. If the catalysts are used simultanously in the presence of each other a precondition is that neither of them get their activity substantially reduced. Through a suitable choice of catalysts and polymerization conditions, the obtained polyethylene composition should have a broad molecular weight distribution. Such polyethylenes are notably well suited for use in extrusion processes, and provided they have an adequate comonomer distribution, blow moulded articles having especially good environmental stress cracking resistances can be obtained.

SUMMARY OF THE INVENTION

It has now surprisingly been found that ethylene polymers having a broad molecular weight distribution can be obtained by a process performed in one single reactor by the use of a catalyst system consisting of two independent catalysts, which comprises (A) divalent chromium oxide on an inorganic support and (B) chromium bonded to a cyclopentadienyl and reacted with an inorganic support.

The present invention thus provides a process for the polymerization of ethylene, optionally with α-olefins, to ethylene homopolymers or copolymers having a broad molecular weight distribution, comprising the steps of polymerizing 100 to 80% by weight of ethylene and 0 to 20% by weight of comonomer in the presence of two independent, simultaneously present catalysts A and B, and optionally also a cocatalyst. The catalysts and the optional cocatalyst are fed into the reactor concurrently, either separately or in the form of a blend. Catalyst A comprises chromium oxide supported on an inorganic support, and the chromium has an oxidation number of predominantly two. Catalyst B comprises a bis-cyclopentadienyl chromium compound reacted with an inorganic support. The bis-cyclopentadienyl chromium compound has the general formula Ar—Cr—Ar' wherein Ar and Ar' are selected from fluorenyl, indenyl and cyclopentadienyl, which are optionally substituted with at least one hydrocarbonyl group which may contain one or more heteroatoms selected from O, N, S, P and B. The polymerizations are performed in ome single reactor at otherwise well known polymerization conditions. The reactor may optionally be provided with a prepolymerization reactor.

The invention also provides a catalyst system for use in the process defined above for the polymerization of ethylene and optionally α-olefins to ethylene homopolymers or copolymers having a broad molecular weight distribution. Said catalyst system is characterized by comprising the two independent catalysts A and B defined above.

Further, the invention provides a polymer composition obtained by the process above. The polymer composition consists of ethylene homopolymers or copolymers with a broad molecular weight distribution. The composition is characterized by being an intimate blend of two polymer components, where (a) 40 to 80% by weight of the total amount of the polymer composition is made up of a polyethylene having $MI_{21<5}$ and $M_w/M_n>15$, and b) 60–20% by weight of the polymer composition is made up of a polyethylene having MI2>300, said polyethylene contains alkyl side branches, said alkyl being ethyl or higher alkyl, in an amount less than 20% of the number of corresponding side branches in said polymer component a).

A particularly preferred polymer composition is an ethylene copolymer having flow properties represented by a ratio $MI_{21}/MI_2>120$; a normalized environmental stress cracking ratio (ESCR) value of at least 450 hours when the melt viscosity measured at 190° C. and a shear rate of 300 $s^1$ ($\eta_{300}$) is within the range of 500 and 750 Pa·s; and having a density in the range between those densities resulting in failure times of 200 h and 1000 h when the normalized ESCR value is 700 h.

DETAILED DESCRIPTION OF THE INVENTION

Figure 1:
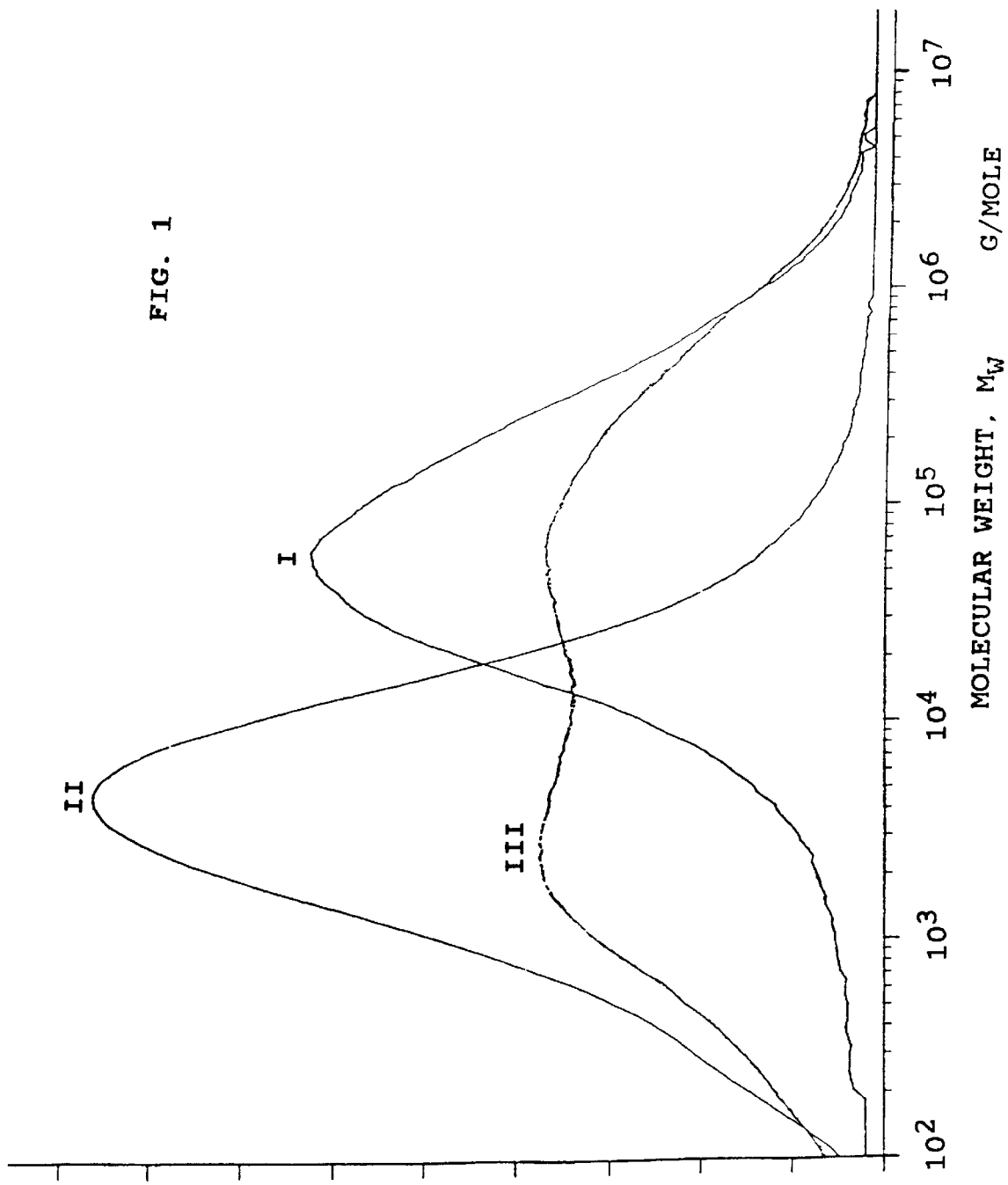
FIG. 1 shows typical molecular weight distribution graphs for polyethylenes obtained by the use of catalyst A alone (graph I), catalyst B alone (graph II), and catalysts A and B combined (graph III).

Both ethylene homopolymers and copolymers can be polymerized by the process of the present invention. When producing copolymers, ethylene is polymerized with up to 20% by weight of one single type of comonomer or a mixture of different comonomers. As used herein, the term "polyethylene" refers to both ethylene homopolymers and ethylene copolymers.

Suitable comonomers includes all types of polymerizable α-olefins of the general formula $CH_2=CHR$, where R is a hydrocarbon radical containing 1–18 carbon atoms, preferably 1–10 carbon atoms. Examples of particularly preferred α-olefins are propylene, 1-butene, 1-hexene, 4-methyl-1-pentene and 1-octene. Also styrene may be used as a comonomer.

The catalyst system used in the process of the present invention comprises two catalysts: one catalyst A comprising primarily divalent chromium oxide supported on an inorganic support; and a catalyst B comprising a bis-dicyclopentadienyl chromium compound reacted with an inorganic support.

Catalyst A is prepared by depositing chromium, for example in the form of chromium nitrate, oxide or acetate dissolved in water, an organochromium compound dissolved in a water-free hydrocarbon solvent, or any other suitable chromium compound, on an inorganic support by the use of any known method. For example, the chromium compound can be coprecipitated with a silica support from a solution, it can be added to an already prepared silica gel, or deposited on dry silica from a liquid phase or gas phase. The present invention is not restricted to any particular procedure for the preparation of the chromium catalyst.

The amount of chromium compound must be sufficient to obtain 0.001–10% by weight of chromium on the support, preferably 0.1–2.0% by weight. After impregnation, the solvent is removed and the remaining solid activated in dry air or another oxygen-containing gas at temperatures in the range from 400 to 950° C., preferably from 550 to 900° C., during a period from 10 minutes to 72 hours, preferably 2 to 20 hours. After calcining, the impregnated catalyst is subjected to reduction, preferably with carbon monoxide or a mixture of carbon monoxide and an inert component, such as nitrogen or argon. The reduction is normally performed at a temperature within the range from 300 to 500° C. during a period from 5 minutes to 48 hours, preferably from 1 to 10 hours. The reduced catalyst will have a blue colour, which indicats that the chromium has been reduced to an oxidation state of 2 or 3. However, up to 50% by weight of the contained amount of chromium may be in an oxidation state higher than 2. The reduced catalyst, either in the form of a dry powder or as a suspension in a dry oxygen-free hydrocarbon solvent, e.g. an alkane, must be stored under inert conditions.

In many prior art polymerization processes the chromium oxide introduced into the reactor has chromium in its highest oxidation state, and the chromium is then reduced with ethylene inside the reactor. It has been observed that if this catalyst in its unreduced form comes into contact with a bis-cyclopentadienyl chromium catalyst, both catalysts will become inactivated. It has now been found that if the chromium oxide catalyst is prereduced, as described above, before being introduced into the reactor, then neither of the two catalysts will be inactivated, and they can even in the presence of each other function simultanously with good activity. Consequently, it is an obligatory feature of the present invention that the chromium oxide catalyst of the catalyst system according to the present invention contains chromium that has been prereduced to an oxidation state of predominantly two.

Catalyst B is prepared by mixing an inorganic support calcined in dry air at 600 to 900° C. with a bis-cyclopentadienyl chromium compound. This compound may be added in the form of e.g. a 5% toluene solution, and the obtained suspension is subsequently dried in a stream of dry nitrogen. This bis-cyclopentadienyl chromium compound has the general formula:

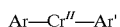

$$Ar\text{---}Cr^{II}\text{---}Ar'$$

wherein Ar, Ar' are selected from the group comprising fluorenyl, indenyl and cyclopentadienyl, which may be substituted with one or more hydrocarbonyl groups selected from unsubstituted and substituted linear, branched, cyclic or partly cyclic alkyl groups; and unsubstituted and substituted monocyclic and polycyclic aryl groups containing at least one hetero-aryl ring. Groups belonging to Ar, Ar', substituted in different positions, may create ring structures. The groups Ar, Ar' may optionally contain hetero atoms, such as O, N, S, P and B. The catalyst may also be modified with ether, e.g. tetrahydrofuran.

When the bis-cyclopentadienyl chromium compound is contacted with the hydroxyl-containing surface of the inorganic, oxygen-containing support, ArH, respectively Ar'H, groups can be split off, e.g. cyclopentadiene. In the surface of the support bonds of type XO—Cr—Ar, respectively XO—Cr—Ar', wherein XO represents the inorganic oxide of the support, will be formed.

The supports for catalysts A and B can be of the same kind, preferred is an inorganic, oxygen-containing compound selected from silica and silica/alumina. The catalyst B support can also contain, besides predominantly silica and/or alumina, minor amounts of oxides of zirconium, titan, phosphor and magnesium. Precursors for catalyst A are commercially available in a number of types, for example in the form of supported chromium acetate or chromium oxide, as; mentioned above.

Catalysts A and B are fed into the polymerization reactor simultaneously, either separately or as a blend. The required amount of catalyst fed into the reactor depends on the activity of each of the catalysts. Their activities can be regulated through their content of chromium. The final polyethylene resin can obtain a desired composition through regulating the weight ratio between catalysts A and B. Preferably, catalyst A constitutes 40 to 90% by weight and catalyst B 60 to 10% by weight of the combined amount of catalysts A and B; more preferably catalyst A constitutes 40 to 80% by weight and catalyst B 60 to 20% by weight; most preferably catalyst A constitutes 45 to 60% by weight and catalyst B 55 to 40% by weight. The catalysts are supplied to the polymerisation reactor as a dry powder or a powder under inert gas, or as a suspension in an inert hydrocarbon liquid. In a commercial continuous process the catalysts should be added in the form of a plurality of small portions with a time interval between each addition much shorter than the catalysts' residence times inside the reactor.

A cocatalyst may also be used, but this is no obligatory feature of the invention. Suitable cocatalysts are methylalkyl compounds of metals from Groups 2, 12 or 13 (previously numbered IIA, IIB and IIIA, respectively) of the periodic system. Preferably, the metal is selected from magnesium, zinc, aluminium and boron, and the alkyl is ethyl. Preferred cocatalysts are selected from diethylmagnesium, diethylzinc, triethylaluminium and triethylboron, particularly triethylaluminium (TEAL) and triethylboron (TEB), and more particularly triethylaluminium (TEAL). The cocatalyst can be introduced into the reactor together with either catalyst A or B, or optionally directly. For instance a cocatalyst, such as TEAL dissolved in heptane, can be added to the prereduced catalyst A, or to catalyst B already impregnated with bis-cyclopentadienyl chromium. A suitable mole ratio is TEAL/Cr=0.1–2. In case TEAL is supplied directly to the reactor, a suitable mole ratio TEAL/total Cr is about 0.8. By adding specific amounts of cocatalysts the melt index of the final polyethylene resin can be increased in a controlled way.

In commercial polymerizations of ethylene, optionally with comonomers, by the process of the present invention, reactor types known per se may be used. The polymerizations are performed continuously in one reactor, which optionally can be provided with a prepolymerization reactor. The polymerizations may be performed in a gas phase or in suspension. If also a prepolymerization reactor is employed, either catalyst A or B, or both, can be prepolymerized with a minor amount of ethylene in accordance with methods known per se, before being introduced into the main reactor.

Hydrogen may also be present during the polymerizations, and the polymerization temperature is normally kept below about 105° C. The most important parameters regulating the polymerization reactions are the hydrogen pressure, the ratio between catalysts A and B, the amount of an optional cocatalyst, and the comonomer concentration. Typical polymerization conditions are presented in the following examples.

The polyethylenes obtained by the process of the present invention have a bimodal molecular weight distribution (MWD), i.e. the molecular weight distribution graph has two more or less distinct peaks. In FIG. 1 the graphs I, II and III represent molecular weight distributions for polyethylenes obtained by the use of catalyst A alone (I), catalyst B alone (II), and catalyst A and B together (III), respectively. The composition and properties of the polyethylene blend can be varied by changing the polymerization conditions. Preferably, the polyethylene blend contains 30 to 95% by weight of polyethylene (I) polymerized from catalyst A, and 70 to 5% by weight of polyethylene (II) polymerized from catalyst B. It is preferred that the polyethylene composition contains from 40 to 90% by weight of polyethylene (I) and from 60 to 10% by weight of polyethylene (II); more preferably 40 to 80% by weight of polyethylene (I) and 60 to 20% by weight of polyethylene (II); most preferably 45 to 70% by weight of polyethylene (I) and 55 to 30% by weight of polyethylene (II). In general, polyethylenes from catalyst A will have a molecular weight ($M_w$) within the range of from about $2 \cdot 10^5$ to about $2 \cdot 10^6$ g/mole, and polyethylenes from catalyst B within the range of from about $10^4$ to about $7 \cdot 10^4$ g/mole. Thus, the resulting polyethylene resins will have a particularly broad molecular weight distribution. The polydispersities ($M_w/M_n$) of the polyethylenes from catalysts A and B are typical within the ranges of from 12 to 40, and from 6 to 12, respectively. The polyethylene from catalyst A has typically a polydispersity of $M_w/M_n$>15. Thus, polyethylenes having a weight average molecular weight ($M_w$) between about $5 \cdot 10^2$ and about $10^6$ g/mole will constitute at least 90% by weight of the polyethylene blend.

The density of polyethylene (I) will be within the range of 910–955 kg/m³ and of polyethylene (II) within the range of 960–972 kg/M³. The resulting polyethylene resin will typically have a density within the range of 925–964 kg/M³. A particularly preferred polyethylene resin obtained by the process of the present invention has a density within the range of 955–964 kg/m³.

The polyethylenes from catalyst B will not have a higher number of ethyl or higher alkyl branches per 1000 carbon atoms in the polymer backbone than the polyethylene from catalyst A. The result is that articles manufactured from the polyethylene resins obtained by the present invention will have an exellent resistance against environmental stress cracking, especially when the polyethylene from catalyst A has a number of side branches of ethyl or greater alkyl groups within the upper part of the range. Preferably, the polyethylene from catalyst B will contain side branches of ethyl and higher alkyls in a number that is less than 20% of the number of corresponding side branches in the polyethylene from catalyst A.

The melt index of polyethylene (I) determined at 190° C. and 2.16 kg load ($MI_2$) is less than 0.1 g/10 min, and with 21.6 kg load ($MI_{21}$) it is within the range of from 0.02 to 20 g/10 min, preferably less than 5 g/10 min. Polyethylene (II) will have a $MI_2$ within the range of from 20 to 10,000 g/10 min and a $MI_{21}$>1000 g/10 min. Preferably, the final polyethylene resin has an average $MI_2 \leq 0.5$ g/10 min and $MI_{21}$=1 to 100 g/10 min.

The present polyethylene composition has a high viscosity at low shear stress. However, as the shear stress increases the viscosity will decrease at a higher rate than what is observed in comparable polyethylene grades. Thus, the present polyethylene composition will have a particularly high flow ratio, preferably is $MI_{21}/MI_2$>200. The result is that the final resin will have a particularly favourable combination of high melt strength and good extrusion properties.

Table 1 presents properties of the polyethylenes obtained with catalysts A and B, respectively, and of the final polyethylene composition.

TABLE 1

| Property | Unit | Polymer with cat. A | Polymer with cat. B | Polymer composition |
| --- | --- | --- | --- | --- |
| Content | wt % | | | A:B = 65:35 |
| MI 2 | g/10 min | | 860 | 0.08 |
| MI 21 | g/10 min | 2 | | 20 |
| $M_w$ | g/mole | 380,000 | 24,000 | 280,000 |
| $M_n$ | g/mole | 14,000 | 2400 | 6000 |
| $M_w/M_n$ | — | 27 | 10 | 47 |
| Density | kg/m³ | 945 | 968 | 958 |
| Side branches, butyl | numbers per 1000 C | 0.7 | 0.0 | 0.5 |

Figure 2:
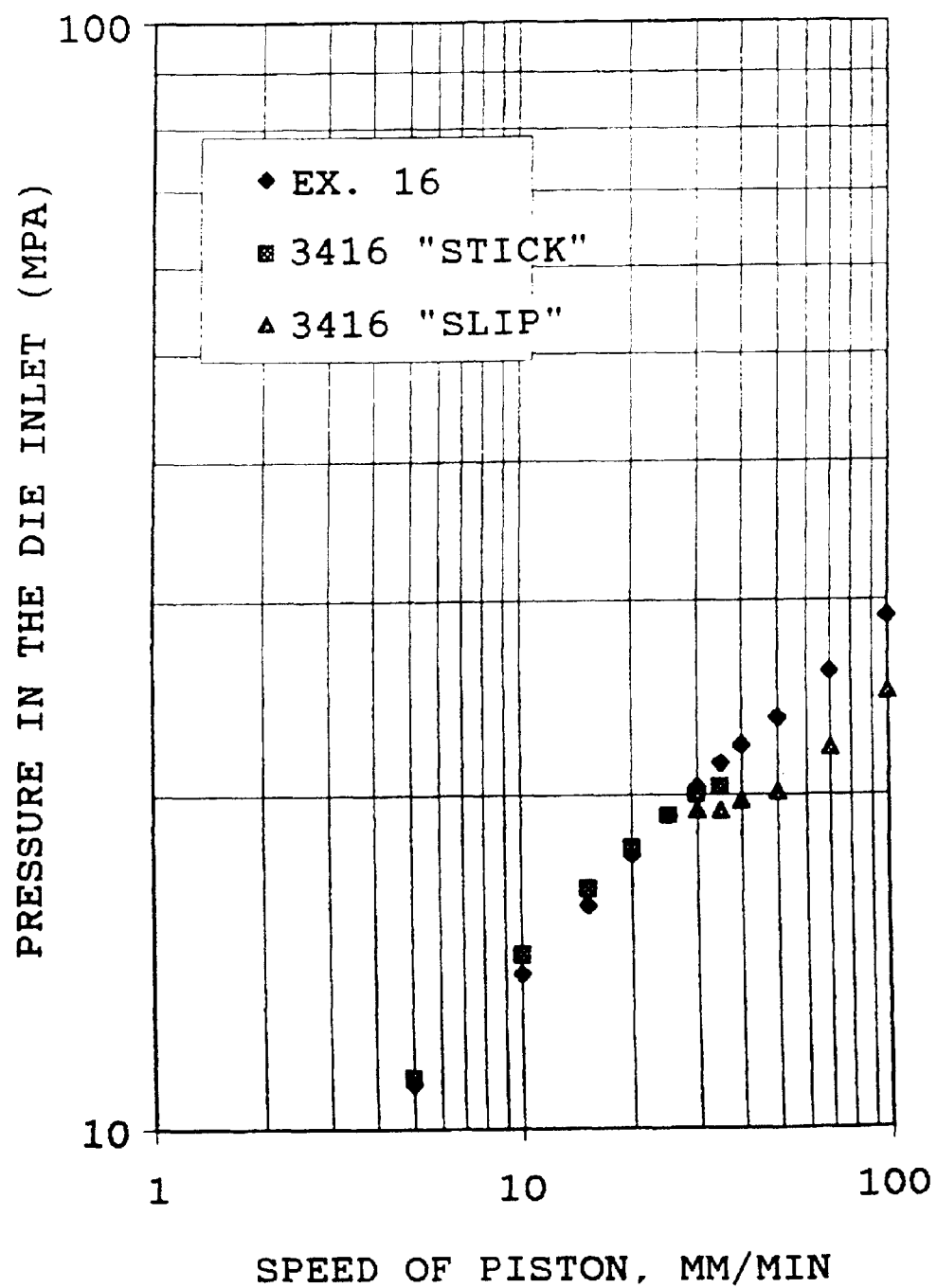
FIG. 2 is a diagram showing the pressure in the inlet section of a capillary die versus the extrusion speed through the die for a polyethylene composition according to the present invention and a comparative composition.

It has been found that the present polyethylene composition when extruded does not display in its melted state those flow defects that are found in corresponding commercially available polyethylene blow-molding grades. Upon extrusion in a capillary rheometer, the present polyethylene composition shows no visible pressure oscillation range with "stop and slip" behaviour (for background information see Dealy and Wissbrun "Melt Rheology and its Role in Plastic Processing", van Nostrand Reinhold 1990, Chap. 8–9). This property is revealed in FIG. 2, where the results from experiments where a polyethylene composition according to the present invention (Example 16) and a commercially available blow-molding grade ("Borealis 3416" from company Borealis AS) have been extruded in a capillary rheometer having a die of diameter 1 mm and length 20 mm and a piston of diameter 15 mm are given. FIG. 2 shows the recorded inlet die pressure versus the piston speed. At a low piston speed the polyethylene "Borealis 3416" will stick to the wall of the die, while at high speed the polyethylene will slip from the wall. As a consequence, the pressure will show a discontinuous drop to a lower level from where the pressure increase will proceed at a lower rate than before. When using such polyethylene grades in commercial blow-molding processing the extrudate may display flow defects. In contrast, the polyethylene composition according to the present invention shows a smooth and continuous change in viscosity in the entire area of interest.

Figure 3:
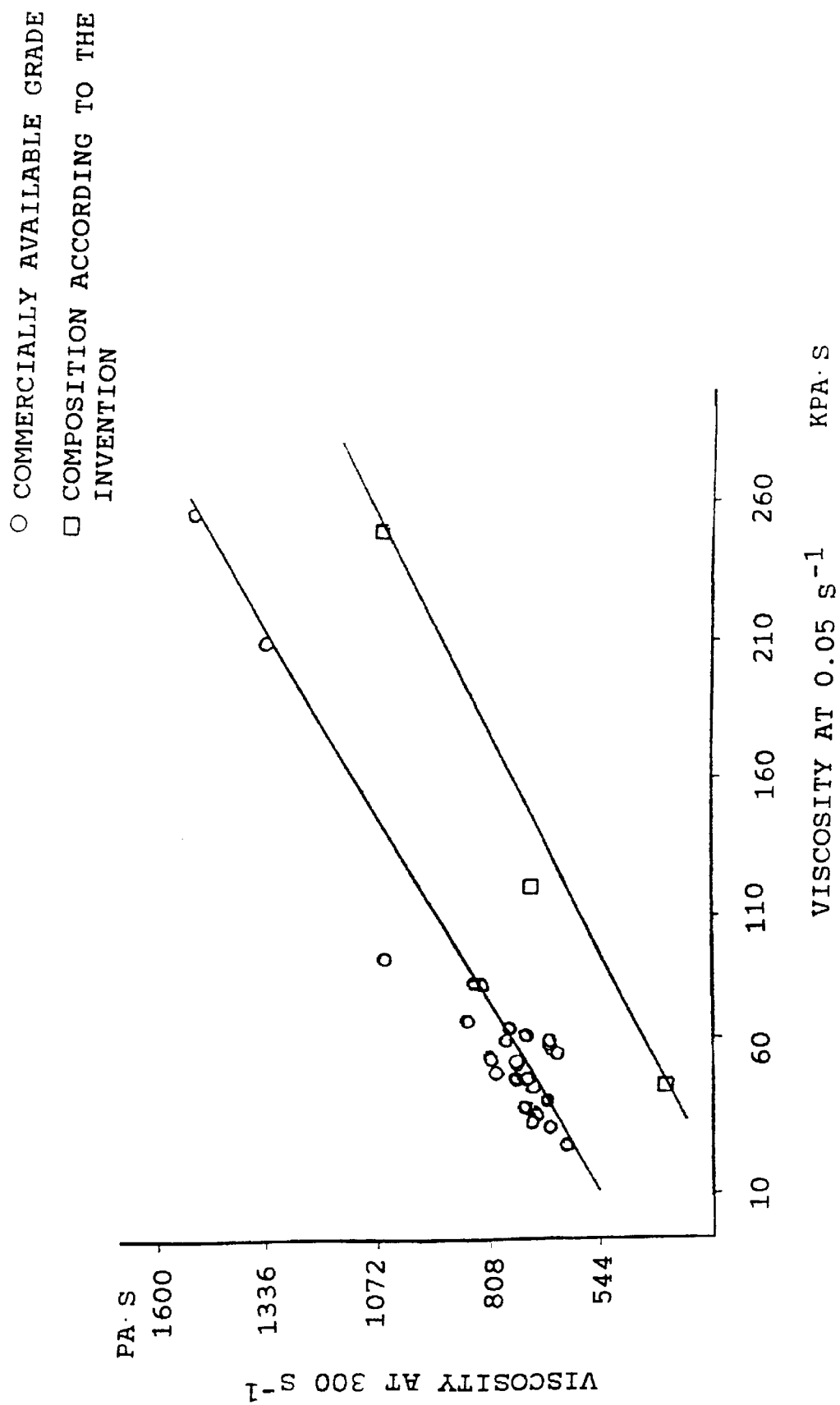
FIG. 3 shows melt viscosities at shear rate 300 $s^{-1}$ versus melt viscosities at shear rate 0.05 $s^{-1}$ for a polyethylene composition according to the present invention and a comparative composition.

The viscosity of polyethylene compositions at a low shear rate of 0.05 s⁻¹ ($\eta_{0.05}$) may be used as an indicator of melt strength, while the viscosity at a high shear rate of 300 s⁻¹ ($\eta_{300}$) may be used as an indicator of extrudability. FIG. 3 shows melt viscosity graphs for the composition according to the present invention (□) and for a commercially available blow molding polyethylene grade (○). It appears from the figure that the polyethylenes according to the present invention combine a high viscosity at low shear rates (zero viscosity) with a low viscosity at high shear rates (high shear thinning), which for one thing has as a result that an extruded parison, because of its high melt strength, will have a high shape stability while being easy to extrude.

Figure 4:
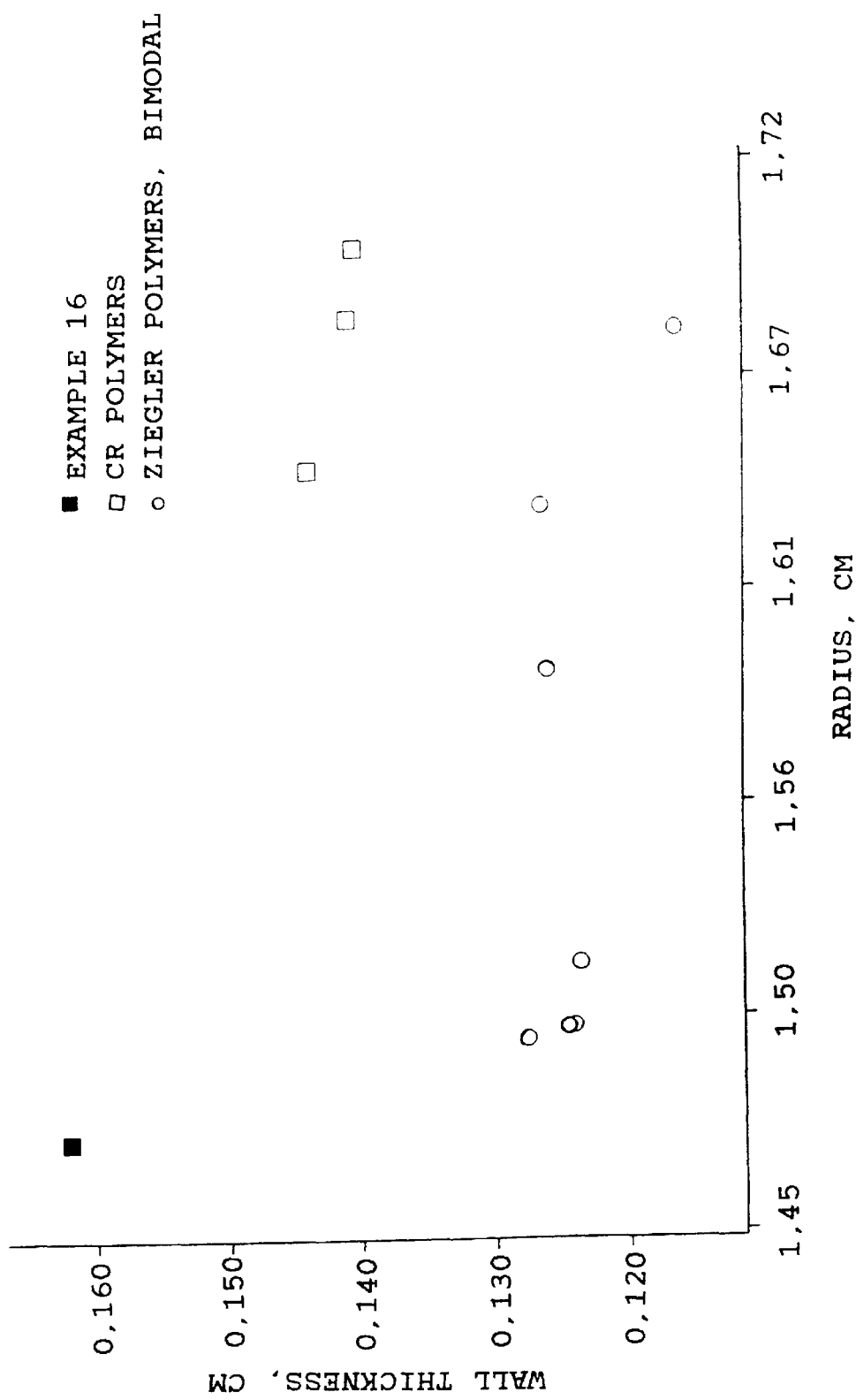
FIG. 4 shows wall thicknesses versus radii in blow moulding parisons extruded from a polyethylene composition according to the present invention and two comparative compositions.

Moreover, it is important that blow molding compositions have a low die swell, which means minor changes in the diameter of the parison, and consequently the parison can easily be fitted to the mold. A high shape stability of the extruded parison (high zero viscosity) implies that it does not sag. This is demonstrated in FIG. 4 where the diameters in 20 cm long parisons have been measured at a position 6 cm below the die outlet. Parisons having an internal diameter of 30 mm were extruded in an ordinary laboratory extruder from a polyethylene resin according to the invention, a Ziegler-based bimodal polyethylene composition and a chromium-based polyethylene composition. Both of the two last mentioned types are frequently used in commercial blow molding processing. From FIG. 4 it can be seen that both of these commercial grades have a rather substantial increase in the parison diameters, and consequently a corresponding decrease in wall thicknesses, due to sag of the parison.

Blow-molded containers are often used to store aggressive chemicals, and in such cases it is a prerequisite that the container in question has a high environmental stress cracking resistance (ESCR). The polyethylene composition according to the present invention is well suited for use in such blow-molded containers. Polyethylene compositions having relatively small differences in densities and viscosities may be compared by calculating a normalized environmental stress cracking resistance (ESCR) defined by the following equation:

$$\text{normalized } ESCR = ESCR \cdot 10^{-a}$$

wherein $$a = -3 \log \frac{600}{\eta_{300}} - 0.18 (d - 958)$$

Figure 5:
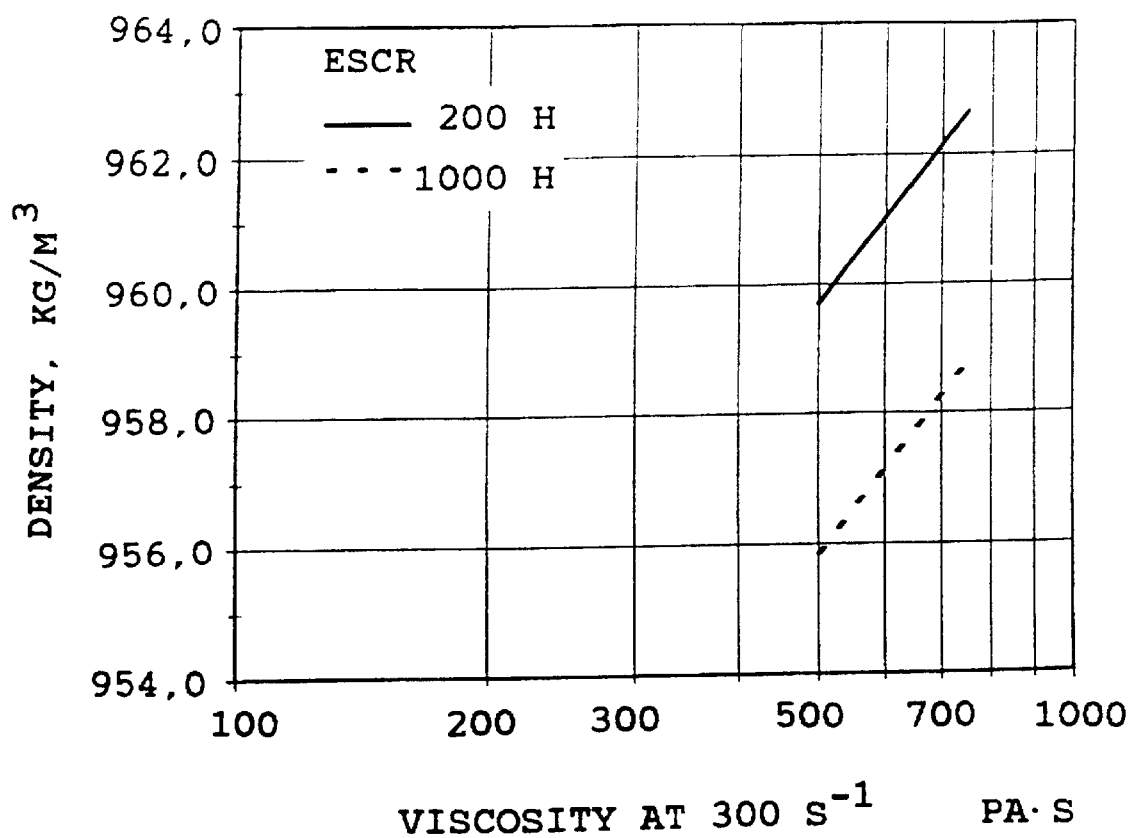
FIG. 5 shows graphs correlating density and viscosity at shear rate 300 $s^{-1}$ for a polyethylene composition according to the present invention having environmental stress cracking resistances of 200 h and 1000h.

In this expression ESCR designates the environmental stress cracking resistance, which is measured as the time in hours (h) until failure according to ASTM D 1693-A; $\eta_{300}$ is the viscosity of the polyethylene composition (Pa·s) determined at shear rate 300 s$^{-1}$ at 190° C.; and d is the density of the polyethylene composition (kg/m$^3$). A particularly preferred polyethylene composition according to the present invention has a density in the range of from 955 to 964 kg/M$^3$, a melt viscosity at shear rate 300 s$^{-1}$ ($\eta_{300}$) in the range of from 500 to 750 Pa·s and a normalized environmental stress cracking resistance of not less than 450 h. A particularly preferred polyethylene composition has a normalized environmental stress cracking resistance greater than 800 h. In FIG. 5 the presented graphs correlate density and viscosity at a shear rate of 300 s$^{-1}$ for polyethylene compositions of the present invention having ESCR values of 200 h and 1000 h, respectively.

EXAMPLES

Testing of polymers

The properties of the produced polyethylenes were determined according to the following methods:

Viscosities at shear rates of 0.05 s$^{-1}$ and 300 s$^{-1}$ at 190° C. were determined in a dynamic spectrometer of type "Rheometrics Dynamic Analyzer RDA-II" having a disk-to-disk specimen support with 25 mm diameter and 1.2 mm opening between the disks. The polyethylene compositions were tested by increasing the frequency of deformation from 0.05 rad/s to 300 rad/s at 10% shear deformation.

Die swell was determined as the ratio between the diameters of extrudate and die. The tests were performed by the use of a capillary rheometer of type "Gottfert rheograf 2000" having a die of diameter 1.5 mm and no parallel length. The polyethylene composition was extruded at 190° C. at 3 different shear rates. The extrudates were then allowed to relax for 1 h at 160° C. in a heating cabinet before the determination of the dimensions. The die swell at shear rate 100 s$^{-1}$ was then calculated by linear regression.

The swell of the extruded parisons were determined by measuring thicknesses and diameters by the use of a picture treatment system described by S. Eggen and A. Sommerfeldt in a publication titled "On-line measurement of parison geometry during blow moulding", Polymer Eng. Sci., Vol36, 1966, p. 336.

Flow defects were determined in a capillary rheometer of type "Rosand RH7" by measuring the pressure drop over a capillary die having the ratio length/diameter=20/1 at different shear rates. The lowest shear rate at which pressure oscillations were observed was defined as the critical shear rate regarding flow defects of type "stop and slip".

Environmental stress cracking resistances were determined as the time until failure for bent, rectangular specimens submersed in a detergent solution according to ASTM D 1693-A.

Melt indices were determined according to ASTM D1238. Densities were determined in a gradient column.

EXAMPLES 1 TO 3

Polymerizations were performed with catalyst A (Comparative Example 1); catalyst B (Comparative Example 2); and a mixture of 60% by weight of catalyst A and 40% by weight of catalyst B (Example 3). Catalysts A and B were prepared as follows:

Catalyst A

A silica support with 1% by weight of deposited chromium (of type "Crosfield EP 30", commercially available from Crosfield Silicas, Warrington, UK) was at fluidizing conditions activated in a stream of dry air at 900° C. for 6 hours, then subjected to reduction for 4 h at 380° C. in nitrogen containing 5% by volume of CO, and then kept in an inert environment.

Catalyst B

A silica support (of type "Grace 955 W" from company Grace GmbH, Worms, Germany) was calcined at 800° C. in a stream of dry air and then kept in an inert environment. In a stainless steal reactor provided with a stirrer 780 g of the thus calcined silica support together with 3000 ml isopentane were introduced. The mixture was suspended and heated to 45° C. 900 ml of a 5% by weight solution of bis-cyclopentadienyl chromium in toluene was added in 20 minutes and the stirring continued for 5 hours. In the end the liquid phase was decanted. Subsequently, 2000 ml pentane and 800 ml toluene were introduced into the reactor, the mixture was again suspended and heated at 45° C. for 20 minutes, and then the liquid phase again decanted. The treatment with pentane and toluene was repeated once more, then 3000 ml pentane was added and the temperature brought to 45° C. before the liquid phase was decanted. Finally, the catalyst was dried in a stream of nitrogen through the reactor.

In a 2 l stainless steal reactor provided with a stirrer and a temperature regulating device a total amount of about 0.1 g catalyst was introduced under nitrogen atmosphere. (In Example 3 catalysts A and B were added simultaneously.) The reactor was pressurized to 400 kPa with hydrogen, 1 liquid isobutane containing 0.15% by weight (about 1.5 ml) of hexene was added, and the temperature raised to 94° C. Subsequently, ethylene was introduced until a total pressure of about 3850 kPa(e). This pressure was maintained during the entire polymerization by feeding ethylene.

Obtained results are given in Table 2. The polymerization yields is given in gram polymer per gram catalyst (g/g). The molecular weight distributions of the polyethylenes are indicated in FIG. 1. According to the obtained results, the polyethylene composition produced by using catalysts A and B together had about the same properties as a blend of those polyethylenes obtained by using catalyst A alone and catalyst B alone.

TABLE 2

| Property | Unit | Ex. 1 (Comp.) | Ex 2 (Comp.) | Ex. 3 |
|---|---|---|---|---|
| Cat. A | wt % | 100 | — | 60 |
| Cat. B | wt % | — | 100 | 40 |
| Yield | g/g | 2352 | 3125 | 2860 |
| MI$_2$ powder | g/10 min | 0.12 | (ca. 10,000) | 2.7 |

TABLE 2-continued

| Property | Unit | Ex. 1 (Comp.) | Ex 2 (Comp.) | Ex. 3 |
|---|---|---|---|---|
| $MI_{21}$ powder | g/10 min | 13 | not determ. | 350 |
| $MI_{21/2}$ | — | 108 | — | 130 |
| Density | kg/m$^3$ | 951 | 942 | 958 |
| $M_w$ | g/mol | 194000 | 14400 | 170000 |
| $M_n$ | g/mol | 15900 | 1960 | 2490 |
| $M_w/M_n$ | — | 12 | 7 | 68 |

EXAMPLES 4 TO 7

These examples show that a non-reduced catalyst A used together with catalyst B will result in a catalyst system having a considerable lower activity than the catalyst system of the invention.

Catalysts A and B, as well as the polymerization conditions, were the same as those used in Examples 1 to 3, except:

Catalyst A was activated at 750° C., and a part of the obtained catalyst was not subjected to reduction with CO (i.e. Cr had an oxidation number of mainly 6+instead of 2+).

Polymerizations were performed using catalyst A in a reduced form alone (Comparative Example 4), and in an unreduced form alone (Comparative Example 5), and catalysts A and B together with catalyst A in a reduced form (Example 6) and with catalyst A in an unreduced form (Comparative Example 7).

The results are presented in Table 3. The results show that the polymer yields are about the same when catalyst A is used alone in a reduced form and in an unreduced form. When using the catalyst system according to the present invention, consisting of a prereduced catalyst A and catalyst B together, the catalytical activity is maintained high. When catalyst A is used in an unreduced form together with catalyst B, the polymer yield is drastically lowered.

EXAMPLES 8 TO 12

Polymerizations were performed at the same conditions as those of Examples 1 to 3, except that the amount of hexene was 5 ml and that hydrogen was fed to a pressure of 250 kPa and ethylene then fed to a pressure of 3550 kPa(e), and the catalysts A and B were used together in a ratio of from 45:55 to 60:40. Catalyst A was identical to the one used in Example 1, except that it had now been activated at 715° C. for 8 hours (instead of being activated at 900° C. for 6 hours). Catalyst B was identical to the one used in Example 2. In Examples 10 to 12 also TEAL was added, as a cocatalyst. In Example 10 TEAL dissolved in heptane was deposited on catalyst A in a quantity corresponding to a molar ratio of TEAL/Cr=0.5. In Example 11 TEAL was added to catalyst B, which had been impregnated with bis-cyclopentadienyl chromium, in a quantity corresponding to a molar ratio of TEAL/Cr=0.5. In Example 12 TEAL was introduced directly into the reactor in a molar ratio of TEAL/(total amount of chromium)=0.8.

The otbained results are presented in Table 4. Examples 9 to 11, where the catalyst ratio was A:B=60:40, reveal that the addition of TEAL does not influence the polymer yield, but it increases the melt index of the obtained polyethylenes. By comparing examples 8, 12 and 9, where the weight ratios A:B were 45:55, 55:45 and 60:40, respectively, it can be seen that in example 12, where TEAL was added, the polymer yield increased and that the obtained polyethylene got an increased melt index. TEAL had no negative influence on the catalyst system used in Examples 8 to 12.

EXAMPLES 13 TO 21

Polymerizations were performed in a pilot plant comprising a continuous reactor having a fluidized bed (the principles of the reactor is described in U.S. Pat. No. 4,354,009, Union Carbide). The polymerization conditions used are given in Table 4.

Catalyst A was prepared from a catalyst precursor comprising a silica support (of type "Grace SP9-8110", from company Grace GmbH, Worms, Germany) having a specific surface area of about 290 m$^2$/g, a pore volume of about 1.4 cm$^3$/g, a chromium content of about 1.0% by weight and an average particle diameter of about 45 µm. The catalyst was activated by a heat treatment in dry air of 750° C. for 7 hours. The catalyst was then subjected to reduction for 5 hours at 380° C. in nitrogen containing 5% by volume of CO (Examples 14 to 19). In some of the polymerizations (Examples 20 and 21) the catalyst was activated at lower temperatures, i.e. at 585° C. for 10 hours.

Catalyst B was prepared as described in Example 2, except that 1360 g silica and 1580 ml chromocene solution were used, and the stirring was continued for 3.5 hours.

Catalysts A and B were preblended and then fed continuously into the reactor. The amount of polymer always inside the reactor was 50 to 60 kg. When the polymerization reaction had obtained a steady state, samples were withdrawn and analyzed for ash content. In a polymer the ash content correlates with the amount of contained catalyst, within the margins of experimental errors. Thus, this correlation can be used as an indication of the efficency of the catalyst in the polymerization reactions.

Experimental parameters and results are presented in Table 5. Comparative Examples 13 and 14 relate to polymers obtained by using catalyst B alone and catalyst A alone, respectively. Examples 15 to 19 reveal that the melt index of a product can be controlled by varying the ratio between catalysts A and B. From Examples 17 and 20 it can be seen that a lower activating temperature during the preparation of catalyst A results in a product of lower melt index.

EXAMPLE 22

The polymerization of Example 3 was repeated, except that the used catalyst comprised 80% by weight of catalyst A and 20% by weight of catalyst B, and that in addition, 5 ml hexene was introduced into the reactor. The polymerization lasted for 77 minutes. The polymer yield was 2796 g/g, i.e. of the same magnitude as in Example 3. The produced polymer blend had a melt index of $MI_{2=0.03}$ g/10 min.

EXAMPLE 23 (COMPARATIVE EXAMPLE)

Polymerizations were performed in the pilot plant used in Examples 13 to 21. The polymerization catalyst was a chromate-containing catalyst (A) to which it had been added a small amount of a chromocene-containing catalyst B. Both catalyst components, A and B, were prepared according to the prior art.

Catalyst A was prepared by activating a silica support of type "Grace 955" (from company Grace GmbH, Germany)

at 600° C. in a fluidized bed, then suspended in pentane and under inert conditions combined with bis-triphenylsilyl chromate and then triethylaluminium. The obtained solid contained 3.2% by weight of chromate and the ratio Al/Cr was 6.3

Catalyst B was prepared as in Example 2, but chromate was used instead of chromocene.

The resulting catalyst blend consisted of 630 g of catalyst A and 17 g of catalyst B (i.e. a weight ratio A:B=97.4:2.6) combined in an atmosphere of dry nitrogen.

To the reactor ethylene ($C_2$) combined with hydrogen ($H_2$) in an amount corresponding to a ratio of $H_2/C_2=0.03$ was fed continuously at a pressure of 1000 kPa. No comonomer was used. The catalyst blend was also fed continuously to the reactor.

The reactor temperature was 100° C., the residence time about 6 hours and the production speed about 10 kg/h. The produced polymer had a density of 957 kg/m³ and melt indices $MI_{21}=182$ and $MI_5=11.2$. The polymer had an ash content of 1260 ppm.

Polymerizations performed under identical conditions with catalyst A alone and catalyst B alone resulted in polymers having an ash content of 300 ppm and 150 ppm, respectively. Thus, an ordinary catalyst A to which it has been added a small amount of catalyst B will show a dramatically reduced activity, as demonstrated by the ash contents of the obtained polymers.

In Table 6 the properties of some selected polymers according to the present invention are compared with commercially available resins intended for the same final use. It can be seen that the polymer compositions according to the present invention will have improved environmental stress cracking resistances (ESCR), demonstrated by the much longer time periods until cracking starts compared with commercial polyethylene grades. Calculated values of normalized environmental stress cracking resistances are also included. The stress cracking tests were systematically terminated after 1000 hours testing, and consequently the calculated values in Examples 17, 18 and for "Borealis 3416", actually are greater than the given figures, as indicated in the table.

TABLE 3

| Ex. | Catalyst system | Cat. A wt % | Cat. B wt % | Time min | Polymer yield g/g | $MI_{21}$ g/10 min | Density kg/m³ |
|---|---|---|---|---|---|---|---|
| Comp. 4 | A reduced | 100 | 0 | 60 | 4380 | 5.2 | 949 |
| Comp. 5 | A unreduced | 100 | 0 | 69 | 3818 | 7.9 | 954 |
| Ex. 6 | A reduced + B | 70 | 30 | 44 | 5627 | 10.5 | 955 |
| Comp. 7 | A unred. + B | 70 | 30 | 60 | 1040 | 12.5 | 957 |

TABLE 4

| | Catalyst | | Polymerization time | Polymer yield | $MI_2$ (powder) | $MI_{21}$ (powder) | | Density |
|---|---|---|---|---|---|---|---|---|
| Ex. | % A | % B | min | g/g | g/10 min | g/10 min | $MI_{21/2}$ | kg/m³ |
| 8 | 45 | 55 | 64 | 1450 | 0.14 | 42 | 300 | 959 |
| 9 | 60 | 40 | 58 | 2385 | 0.018 | 4.1 | 227 | 950 |
| 10[3] | 60 | 40 | 61 | 2553 | 0.08 | 26 | 325 | 955 |
| 11[4] | 60 | 40 | 64 | 2577 | 0.05 | 6.8 | 136 | 952 |
| 12[2] | 55 | 45 | 60 | 2462 | 0.5 | 85 | 170 | 957 |

[2]TEAL on catalyst A, mole ratio TEAL/Cr = 0.5.
[3]TEAL fed to the reactor, mole ratio TEAL/total Cr = 0.8.
[4]TEAL added to catalyst B, mole ratio TEAL/Cr = 0.5.

TABLE 5

| | | | Polymerization conditions | | | | | Polymer properties | | | | |
|---|---|---|---|---|---|---|---|---|---|---|---|---|
| | Catalyst | | Pol. temp | Prod.-rate | Ethylene | Mole ratio | Mole ratio | Melt index | | | Density | Ash cont. |
| Ex. | % A | % B | ° C. | kg/h | bar | $H_2/C_2=$ | $C_6=/C_2=$ | $MI_2$ g/10' | $MI_{21}$ g/10' | $MI_{21/2}$ | kg/m³ | ppm |
| Comp 13 | 0 | 100 | 100 | 10 | 14 | 0.15 | 0.0042 | 484 | — | — | 964 | 185 |
| Comp 14 | 100 | 0 | 94 | 10 | 14 | 0.15 | 0.0065 | — | 1.1 | — | 945 | 100 |
| 15 | 50 | 50 | 99 | 8 | 9 | 0.148 | 0.0030 | 2 | 300 | 150 | 963 | 550 |
| 16 | 53 | 47 | 94 | 7 | 13 | 0.15 | 0.0063 | — | 10 | — | 954 | 230 |
| 17 | 53 | 47 | 98 | 9 | 13 | 0.19 | 0.0017 | 0.08 | 20 | 267 | 958 | 400 |
| 18 | 53 | 47 | 98 | 9 | 13 | 0.19 | 0.0017 | 0.08 | 20 | 267 | 958 | 400 |
| 19 | 58 | 42 | 99 | 11 | 14 | 0.15 | 0.0048 | — | 8.0 | — | 952 | 270 |
| 20 | 53 | 47 | 99 | 9 | 14 | 0.15 | 0.0032 | — | 4.0 | — | 953 | 180 |
| 21 | 71 | 29 | 99 | 11 | 14 | 0.13 | 0.0042 | — | 3.0 | — | 951 | 210 |

TABLE 6

| Example | Catalyst % A | Catalyst % B | Viscos. at 300 s$^{-1}$ Pa·s | ESCR h | Die swelling | MI$_2$* g/10 min | MI$_{21}$* g/10 min | Density kg/m$^3$ | Normalized ESCR h |
|---|---|---|---|---|---|---|---|---|---|
| 8 | 45 | 55 | 558 | 224 | 3.19 | 0.08 | 26 | 961 | 966 |
| 12 | 55 | 45 | 536 | 133 | 3.06 | 0.08 | 29 | 960 | 427 |
| 17 | 53 | 47 | 640 | >1000 | n.d. | 0.08 | 20 | 958 | >824 |
| 18 | 53 | 47 | 590 | >1000 | n.d. | 0.15 | 30 | 956 | >459 |
| 19 | 58 | 42 | 911 | >1000 | n.d. | n.d. | 6 | 952 | n.d. |
| 20 | 53 | 47 | 992 | >1000 | n.d. | n.d. | 6 | 953 | n.d. |
| Borealis 3416 | | | 706 | >1000 | 3.12 | 0.24 | 25 | 958 | >614 |
| Stamylan 8621 | | | 728 | 150 | 3.55 | 0.19 | | 957 | 269 |
| Marlex 5502 | | | 623 | 44 | 3.42 | 0.35 | | 955 | 161 |
| Mobil HYA 600 | | | 733 | 115 | 3.60 | 0.20 | | 957 | 266 | n.d. = not determined
*measured with extruded/homogenized resin

What is claimed is:

1. A process for the polymerization of ethylene, optionally with α-olefins, to ethylene homopolymers or copolymers having a broad molecular weight distribution, comprising the steps of polymerizing 100 to 80% by weight of ethylene and 0 to 20% by weight of comonomer in the presence of two independent, simultaneously present catalysts A and B, and optionally also a cocatalyst; said catalysts and optional cocatalysts are fed into the reactor concurrently, either separately or in the form of a blend, where said catalyst A comprises chromium oxide supported on an inorganic support, and the chromium has an oxidation number of predominantly two; and said catalyst B comprises a bis-cyclopentadienyl chromium compound reacted with an inorganic support, said bis-cyclopentadienyl chromium compound having the general formula Ar—Cr—Ar', wherein Ar and Ar' are selected from fluorenyl, indenyl and cyclopentadienyl, which are optionally substituted with at least one hydrocarbonyl group which may contain one or more heteroatom selected from 0, N, S, P and B.

2. The process of claim 1, wherein the comonomer comprises at least one α-olefin selected from α-olefins of formula CH$_2$=CHR, wherein R is a hydrocarbon radical containing 1 to 10 carbon atoms.

3. The process of claims 1 or 2, wherein said process is performed continuously in one reactor, which optionally is provided with a prepolymerization reactor.

4. The process of claim 1 wherein hydrogen is present during the polymerization.

5. A catalyst system for the use in the process of claim 1 for the polymerization of ethylene and α-olefins to ethylene homopolymers and copolymers having a broad molecular weight distribution, comprising two independent catalysts, A and B, where said catalyst A comprises chromium oxide supported on an inorganic support, and the chromium in a predominantly oxidation state of two; and said catalyst B comprises a bis-cyclopentadienyl chromium compound being reacted with an inorganic support, said bis-cyclo-pentadienyl chromium compound having the general formula Ar—Cr—Ar', where Ar and Ar' are selected from fluorenyl, indenyl and cyclopentadienyl, which are optionally substituted with at least one or more hydrocarbonyl group which may contain at least one heteroatom selected from O, N, S, P and B.

6. The catalyst system according to claim 5, wherein said inorganic supports are selected from silica and silica/alumina.

7. The catalyst system according to claims 5 or 6, wherein said catalyst A contains from 0.1 to 2% by weight of chromium.

8. The catalyst system according to claim 5, wherein less than 50% by weight of the chromium contained in said catalyst A has an oxidation state greater than 2.

9. The catalyst system according to claim 5, wherein said catalyst A constitutes 40 to 90% by weight and catalyst B constitutes 60 to 10% by weight of said catalyst system.

10. The catalyst system according to claim 9, wherein said catalyst A constitutes 40 to 80% by weight and catalyst B constitutes 60 to 20% by weight of said catalyst system.

11. The catalyst system according to claim 5, wherein said catalyst A and/or said catalyst B further comprise a cocatalyst selected from diethylmagnesium, diethylzinc, triethylaluminum and triethylboron.

12. The catalyst system according to claim 11, wherein said cocatalyst is triethylaluminum.

* * * * *